(12) United States Patent
Guemmer

(10) Patent No.: US 8,562,288 B2
(45) Date of Patent: Oct. 22, 2013

(54) FLUID FLOW MACHINE WITH BLADE ROW GROUP

(75) Inventor: Volker Guemmer, Mahlow (DE)

(73) Assignee: Rollys-Royce Deutschland Ltd & Co KG (DE)

( * ) Notice: Subject to any disclaimer, the term of this patent is extended or adjusted under 35 U.S.C. 154(b) by 595 days.

(21) Appl. No.: 12/815,805

(22) Filed: Jun. 15, 2010

(65) Prior Publication Data

US 2011/0014040 A1 Jan. 20, 2011

(30) Foreign Application Priority Data

Jul. 17, 2009 (DE) .......................... 10 2009 033 591

(51) Int. Cl.
*F01D 17/12* (2006.01)

(52) U.S. Cl.
USPC .......................................... 415/148; 415/220

(58) Field of Classification Search
USPC .......... 415/148, 220, 222, 914, 182.1, 77, 79, 415/76; 416/193 A
See application file for complete search history.

(56) References Cited

U.S. PATENT DOCUMENTS

| | | | |
|---|---|---|---|
| 2,974,858 A | 3/1961 | Koffel et al. | |
| 2,991,929 A | 7/1961 | Stalker | |
| 3,937,592 A * | 2/1976 | Bammert | 415/194 |
| 4,460,309 A | 7/1984 | Walsh | |
| 6,017,186 A | 1/2000 | Hoeger et al. | |
| 7,011,495 B2 | 3/2006 | Guemmer | |
| 7,445,426 B1 * | 11/2008 | Matheny et al. | 415/135 |
| 2004/0013520 A1 * | 1/2004 | Guemmer | 415/199.5 |
| 2006/0078420 A1 * | 4/2006 | Barbe et al. | 415/159 |

FOREIGN PATENT DOCUMENTS

DE 19650656 6/1998

OTHER PUBLICATIONS

German Search Report dated Jun. 14, 2010 from counterpart foreign application.

* cited by examiner

*Primary Examiner* — Edward Look
*Assistant Examiner* — Juan G Flores
(74) *Attorney, Agent, or Firm* — Timothy J. Klima; Shuttleworth & Ingersoll, PLC

(57) ABSTRACT

A fluid flow machine has a main flow path in at least one stage, with a rotor arrangement and a stator arrangement, resulting in an increased rotor-stator constriction ratio QRS, which satisfies the following equation:

$$[0.2+(KT-0.45)^{0.1}]<QRS,$$

with QRS being defined to the following formula:

$$QRS=KR/KS$$

with KT being the total stage constriction, and with QRS and KT being determined as follows:

$$QRS=KR/KS \text{ with } KR=ARI/ARA$$

and $KS=ASI/ASA$ $$KT=ARI/ASA$$

with ARI, ARA, ASI and ASA being calculated as follows:

$$ARI=\pi(R_2^2-R_1^2)$$

$$ARA=\pi(R_4^2-R_3^2)$$

$$ASI=\pi(R_6^2-R_5^2)$$

$$ASA=\pi(R_8^2-R_7^2).$$

18 Claims, 6 Drawing Sheets

$P_i = P(X_i, R_i)$ $ARI = \pi(R_2^2 - R_1^2)$ $ARA = \pi(R_4^2 - R_3^2)$ $ASI = \pi(R_6^2 - R_5^2)$ $ASA = \pi(R_8^2 - R_7^2)$ $KR = ARI / ARA$ $KS = ASI / ASA$ $KT = ARI / ASA$ $QRS = KR / KS$ $[0{,}2 + (KT - 0{,}45)^{0{,}1}] < QRS$

FLUID FLOW MACHINE WITH BLADE ROW GROUP

This application claims priority to German Patent Application DE102009033591.9 filed Jul. 17, 2009, the entirety of which is incorporated by reference herein.

This invention relates to a fluid flow machine with a main flow path formed by a hub and a casing, in which at least one arrangement of rotating blades (a rotor) is provided, which transfers energy to the fluid, and in which an arrangement of stationary vanes (a stator) is provided adjacently to the rotor, with the rotor blades being attached to a rotating shaft and at least the rotor or the stator being formed in accordance with the present invention by a blade row group, i.e. a group of several, in the main flow direction directly adjacent blade rows of the same type, a rotor blade group or a stator vane group.

The aerodynamic loading of fluid flow machines, such as blowers, compressors, pumps and fans, which can be operated with gaseous and liquid media, is determined by the growth and the separation of boundary layers on both the blades and the hub and casing walls. Normally, good operating characteristics are obtained if the aerodynamic load is distributed uniformly on the rotor blades and the stator vanes, for example in a blower or compressor stage. In this case the constriction of the main flow path (annulus), i.e. the decrease of the cross-sectional area of the flow path in the direction of flow necessary for compressive working media between the entry and the exit plane of a stage, is very similar on rotor and stator. Minor differences in the constriction of the rotor and the stator result from the degree of reaction selected for the respective stage.

In designs according to the state of the art, the inner and outer main flow path contours, for example of blowers and compressors, converge continuously showing a conical shape (taper) without unevenness.

Contours of the main flow path known from the state of the art show a continuously conical shape, other arrangements according to the state of the art relate to fluid flow machines with, as compared to the stator, strong constriction of the rotor, with the stage being formed by only a single rotor blade and stator vane row each.

In a broad aspect, the present invention provides a fluid flow machine with a blade row group of the type specified at the beginning above which, while being dependable in operation, will aerodynamically unload the rotor and if applicable the rotor blade row group.

The present invention accordingly provides a contour of the main flow path, whose cross-sectional area in at least one of its stages, having a rotor and a stator, and in at least the rotor or the stator, having a blade/vane row group, results in a rotor-stator constriction ratio QRS, which satisfies the following equation:

$$[0.2+(KT-0.45)^{0.1}] < QRS,$$

with KT being the total stage constriction. QRS and KT are calculated as follows:

$$QRS = KR/KS \text{ with } KR = ARI/ARA$$

and $KS = ASI/ASA$ $$KT = ARI/ASA$$

with ARI, ARA, ASI and ASA being calculated as follows:

$$ARI = \pi(R_2^2 - R_1^2)$$

$$ARA = \pi(R_4^2 - R_3^2)$$

$$ASI = \pi(R_6^2 - R_5^2)$$

$$ASA = \pi(R_8^2 - R_7^2)$$

where in the direction of flow of the fluid flow machine $R_1$ is the radius on the radially innermost point of the leading edge of the most upstream blade row of the rotor, $R_2$ is the radius on the radially outermost point of the leading edge of the most upstream blade row of the rotor, $R_3$ is the radius on the radially innermost point of the trailing edge of the most downstream blade row of the rotor, $R_4$ is the radius on the radially outermost point of the trailing edge of the most downstream blade row of the rotor, $R_5$ is the radius on the radially innermost point of the leading edge of the most upstream vane row of the stator, $R_6$ is the radius on the radially outermost point of the leading edge of the most upstream vane row of the stator, $R_7$ is the radius on the radially innermost point of the trailing edge of the most downstream vane row of the stator, $R_8$ is the radius on the radially outermost point of the trailing edge of the most downstream vane row of the stator.

The present invention is characterized by a variety of merits.

The invention applies to a fluid flow machine of the axial or semi-axial design for both gaseous and liquid working media.

The inventive solution can be applied to fluid flow machines with only one stage having a rotor and a stator and with multiple stages, each having a rotor and a stator.

As already known from the state of the art, the rotor includes a number of blades which are fitted to the rotating shaft of the fluid flow machine and transfer energy to the working medium. The stator, which is arranged downstream of the rotor, includes a number of stationary vanes which are either shrouded on the ends or have a free blade end. Both, rotor and stator, are situated in a casing.

Furthermore, the fluid flow machine in the inventive embodiment may be provided with a stator (inlet guide vane assembly) upstream of the first rotor. The rotor blades and the stator vanes may be rotatable enabling them to be adjusted from the outside of the main flow path, for example by means of a spindle.

With the option in accordance with the present invention it is favorable, if the stator of at least one stage of the fluid flow machine is of the high-lift configuration. Under this aspect, it is advantageous to provide the individual stages of this fluid flow machine with a contour of the main flow path which allows a significant increase of the constriction over the rotor combined with a reduced constriction over the stator. Departing from the state of the art, it is useful in this case to provide a notable excess of the rotor-stator constriction ratio of at least one stage of the fluid flow machine having a blade row group. Considering a stage of a multi-stage fluid flow machine, the constriction at the rotor in the stage is relatively high, while the constriction at the stator in the same stage is much lower. This situation can be quantified by the indicated inventive constriction ratio QRS between rotor and stator.

The invention is described below with references to the accompanying drawings in which.

Figure 1:
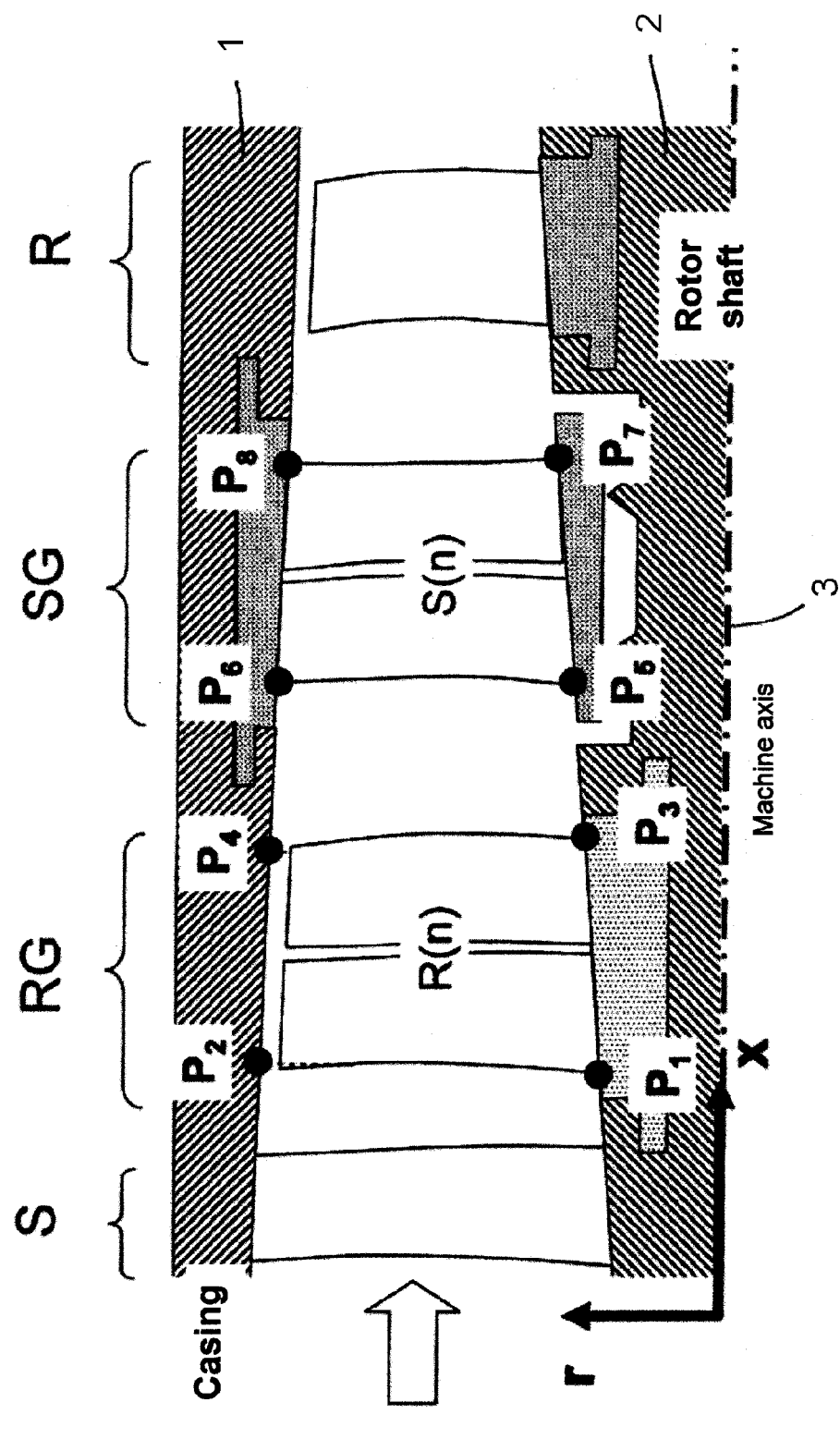
FIG. 1 shows a section of a multi-stage fluid flow machine with a definition of the cross-sectional areas of the main flow path.

For clarity of the present invention, FIG. 1 shows a section of a multi-stage fluid flow machine with a definition of the cross-sectional areas of the main flow path.

FIG. 1 shows the nth stage of a multi-stage machine. The four corner points of the rotor R(n) and of the stator S(n) are specially marked. Both the rotor and the stator here exemplarily include a blade row group RG or SG, respectively, as represented here with two member blade rows each. However, according to the present invention, more than two member blade rows are also providable on both the rotor and the stator. At least one stage of the fluid flow machine must, according to the present invention, include at least one blade row group on the rotor or the stator, enabling the following configurations according to the present invention:

1.) Rotor with conventional single-row configuration, followed by a stator with vane row group, 2.) Rotor with blade row group, followed by a stator with conventional single-row configuration, 3.) Rotor with blade row group, followed by a stator with vane row group.

The corner points $P_1$ to $P_8$ are defined by the intersections of the casing or the hub, respectively, and the leading and trailing edges (or their extensions in the case of rotor blade or stator vane ends with gap, with the extensions being orthogonal to the main flow path rim). If the hub or casing contour in the circumferential direction does not extend with a constant radius, the arithmetically averaged radius in the circumferential direction will apply. The rotor R(n) has the points $P_1$ to $P_4$, the stator S(n) has the points $P_5$ to $P_8$. Each point P(i) has the axial position X(i) and the radius R(i). The coordinate reference system lies on the machine axis.

Figure 2:
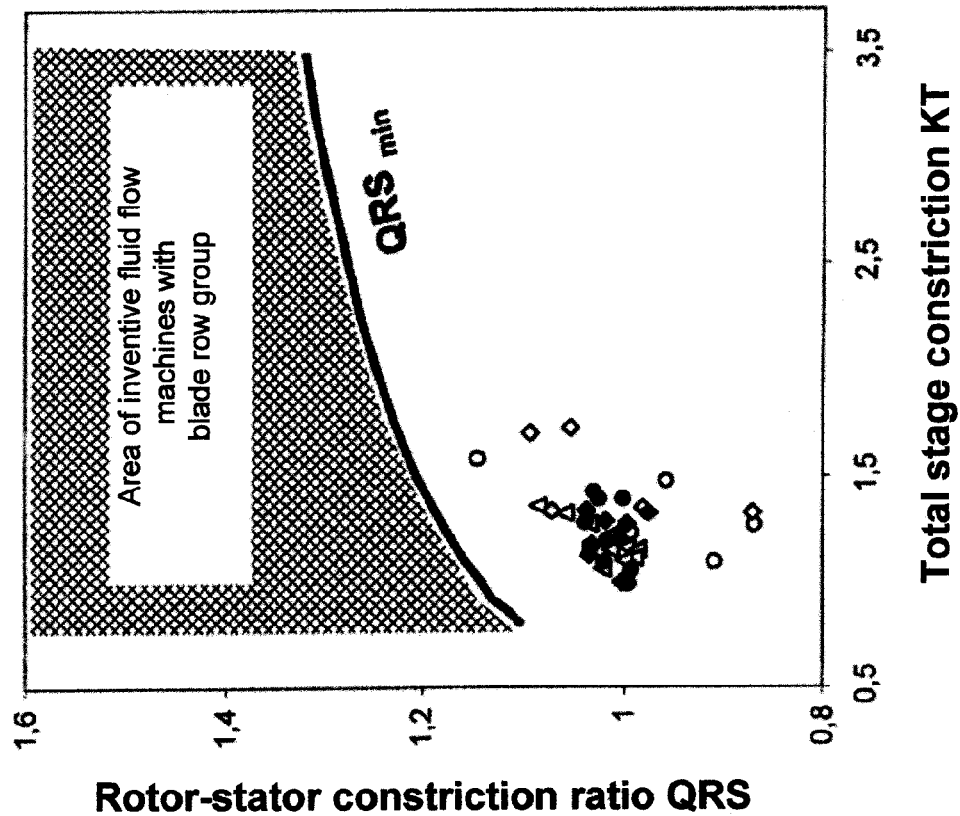
FIG. 2 shows the formulas for the calculation of the four cross-sectional areas of the main flow path ARI, ARA, ASI and ASA that can be calculated from the appertaining radii.

FIG. 2 shows the formulas for the calculation of the four cross-sectional areas of the main flow path ARI, ARA, ASI and ASA that can be calculated from the appertaining radii. Accordingly, the rotor constriction is obtained from KR=ARI/ARA, while the stator constriction is calculated from KS=ASI/ASA.

Consequently, the constriction ratio between rotor and stator is QRS=KR/KS.

Furthermore, the total-stage constriction KT=ARI/ASA is important.

The present invention relates to a range of excessive values of QRS in dependence of KT according to the following rule:

$$[0.2+(KT-0.45)^{0.1}]<QRS$$

The relationship according to the above formula is shown in graphical form on the right-hand side of FIG. 2. As is apparent, the fluid flow machines according to the state of the art lie clearly below the boundary line to the inventive designs.

Figure 3:
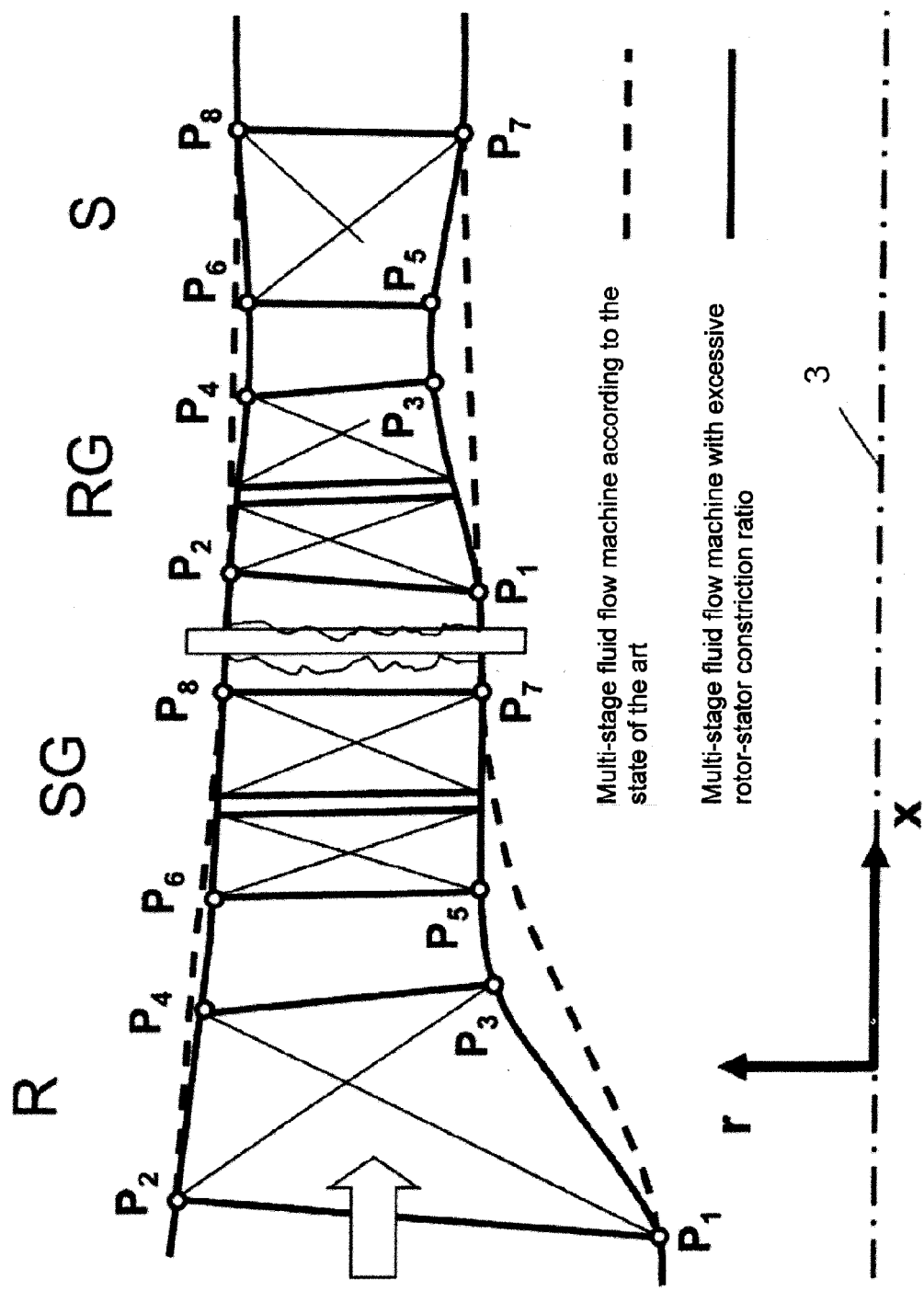
FIG. 3 shows an exemplary contour of a main flow path according to the present invention in comparison with a main flow path according to the state of the art.

FIG. 3 shows an exemplary contour of a main flow path according to the present invention in comparison with a main flow path according to the state of the art. The first stage shown of the fluid flow machine exemplarily includes a single-row rotor and a stator with vane row group, while the second stage shown of the machine includes a rotor with blade row group and a single-row stator. The machine is always flown from left to right, as indicated by the thick arrow. The corner points required for the definition of the rotor-stator constriction ratio QRS of the rotor and stator arrangements of a respective stage are marked $P_1$, $P_2$, $P_3$, $P_4$, $P_5$, $P_6$, $P_7$ and $P_8$ in both stages shown, in accordance with FIG. 1.

Figure 4:
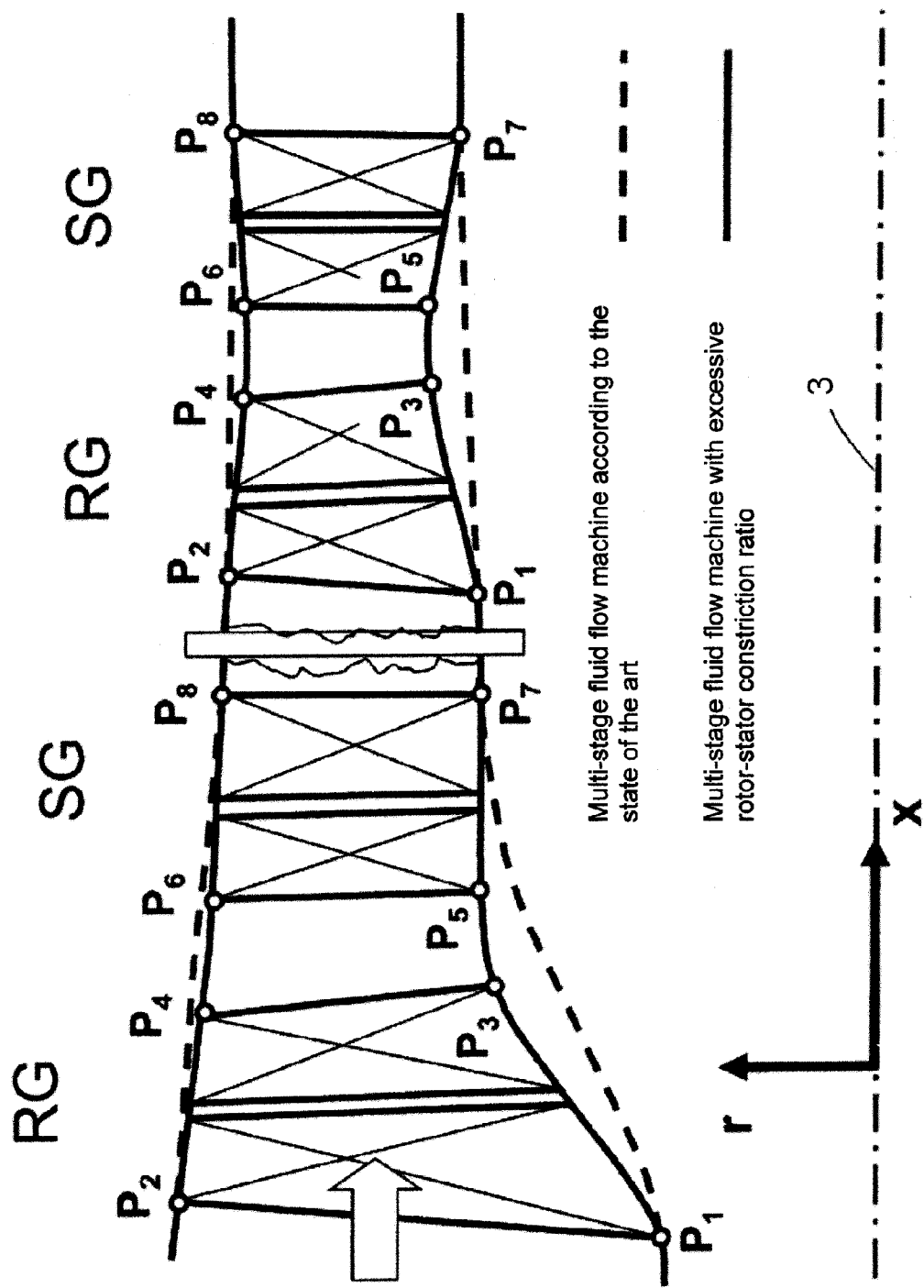
FIG. 4 shows a fluid flow machine according to the present invention with blade row group on the rotor and vane row group on the stator in both stages shown.

FIG. 4 shows the example of a fluid flow machine according to the present invention with blade row group on the rotor and vane row group on the stator in both stages shown. Also here, the corner points required for the definition of the rotor-stator constriction ratio QRS of the rotor and stator arrangements of a stage are marked $P_1$, $P_2$, $P_3$, $P_4$, $P_5$, $P_6$, $P_7$ and $P_8$ in both stages shown.

FIG. 5 again shows a multi-stage fluid flow machine, with two selected stages being represented. The first stage includes a single-row rotor and a vane row group with three member vane rows on the stator. The second stage shows a blade row group with two member blade rows on the rotor and a single-row stator. The number of member blade/vane rows of three or two, respectively, is an example only and can also be greater according to the present invention. Also here, the corner points required for the definition of the rotor-stator constriction ratio QRS of the rotor and stator arrangements of a stage are marked $P_1$, $P_2$, $P_3$, $P_4$, $P_5$, $P_6$, $P_7$ and $P_8$ in both stages shown.

Figure 5:
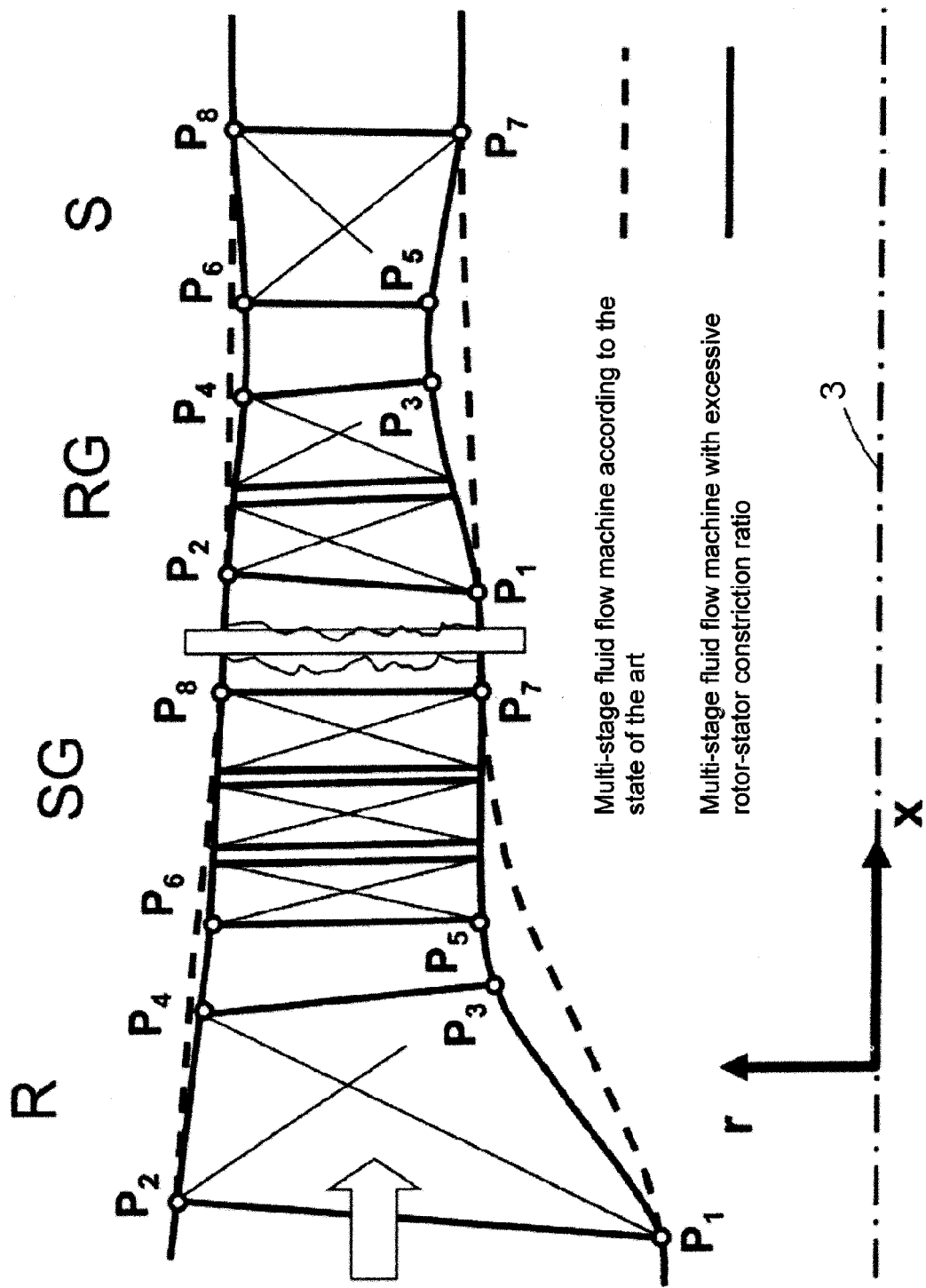
FIG. 5 shows a multi-stage fluid flow machine, with two selected stages being represented.

The corner points to be used according to the present invention for the definition of the relevant surfaces of the rotor and stator of the stages are specifically marked in FIGS. 3, 4 and 5 with a small circle.

Using the state of the art as basis, the QRS criterion can be satisfied in accordance with the present invention by solely the shape of the hub contour, by solely the shape of the casing contour, or by a combination of the shapes of the hub and the casing contours, respectively.

According to the present invention, it is particularly favorable if, as shown in FIGS. 1, 3, 4 and 5, a stage with blade row group and excessive rotor-stator constriction ratio is provided downstream with at least one further, directly adjacent stage, this consequently being a multi-stage formation. It is further advantageous according to the present invention to provide the excessive constriction ratio in more than one stage with a blade row group, ideally in directly adjacent stages.

As is evident, an only simplified representation has been selected in FIGS. 3, 4 and 5. Departing from the representation there, the rotor entry and the stator exit points are also variable according to the present invention.

The comparison with the state of the art reveals that the known contours of the main flow path do not include the use of highly different constrictions (area ratios) in stages with blade row group. Accordingly, the solution in accordance with the present invention is highly advantageous if different design methodologies are applied for the rotor and the stator of one stage. These may include the use of traditional techniques at the rotor and the application of vane row groups at the stator, or the use of traditional techniques at the stator and the application of blade row groups at the rotor.

It is furthermore highly important according to the present invention to specifically design the areal contour through a blade/vane row group of the rotor or the stator.

Figure 6:
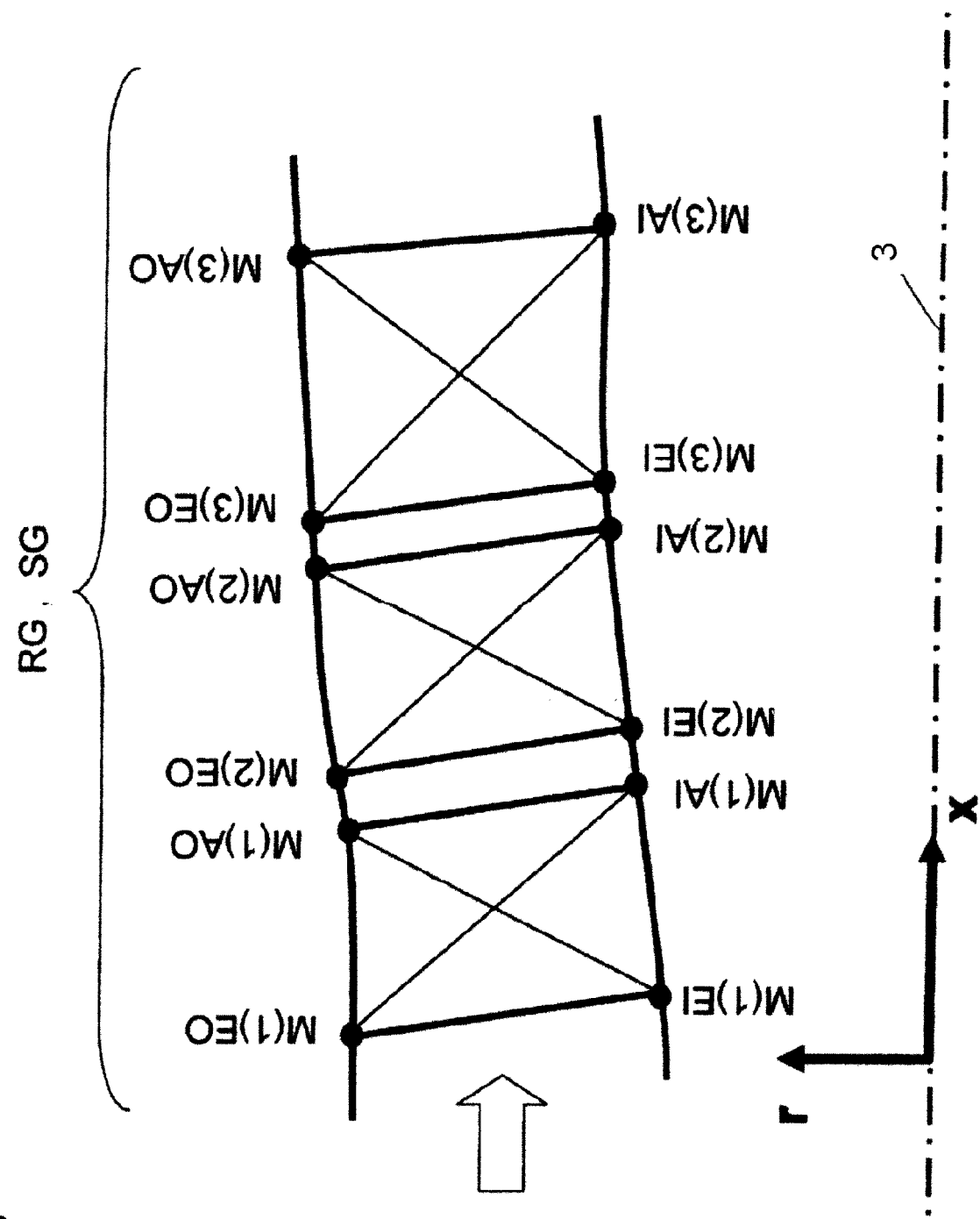
FIG. 6 shows the blade/vane row group of a rotor or also a stator.

FIG. 6 shows the blade/vane row group of a rotor or also a stator. Here, the blade row group represented exemplarily has N=3 member blade rows. Accordingly, a running index between i=1 and i=3 is reflected in the nomenclature of the corner points of the member blade rows. For example, M(1)EI is the inner leading edge point of the first member blade row. In the case of a rotor blade row group, the points M(1)EI, M(1)EO, M(N)AI and M(N)AO correspond to the points $P_1$, $P_2$, $P_3$ and $P_4$. In the case of a stator vane row group, the points M(1)EI, M(1)EO, M(N)AI and M(N)AO correspond to the points $P_5$, $P_6$, $P_7$ and $P_8$.

The blade row group is flown from left to right, as indicated by the thick arrow. The radii R appertaining to the corner points enable the cross-sectional areas of the main flow path to be determined. Accordingly, the following applies to the entry area of the member blade row i, established with the leading edge points M(i)EI and M(i)EO:

$$AM(i)E = \pi(R_{M(i)EO}^2 - R_{M(i)EI}^2)$$

The following applies to the exit area of the member blade row i, established with the trailing edge points M(i)AI and M(i)AO:

$$AM(i)A = \pi(R_{M(i)AO}^2 - R_{M(i)AI}^2)$$

The constriction of the member blade row i results as:

$$KM(i) = AM(i)E/AM(i)A$$

For the cross-sectional areas and the constriction of the member blade row i+1, the following accordingly applies:

$$AM(i+1)E = \pi(R_{M(i+1)EO}^2 - R_{M(i)EI}^2)$$

$$AM(i+1)A = \pi(R_{M(i+1)AO}^2 - R_{M(i+1)AI}^2)$$

$$KM(i+1) = AM(i+1)E/AM(i+1)A$$

If blade row groups and the design of the fluid flow machine according to the present invention are used, the inflow mach number of the individual member blade rows significantly decreases in the main flow direction, so that it is advantageous according to the present invention if within at least one pair of blade rows, formed by two directly adjacent blade rows of the blade row group, the further upstream member blade row M(i) has no significantly smaller constriction than the further downstream member blade row M(i+1), according to the following provision:

$$KM(i)/KM(i+1) > 0.85$$

It is further advantageous according to the present invention if the further upstream member blade row M(i) has a larger constriction than the further downstream member blade row M(i+1), according to the following provision:

$$KM(i)/KM(i+1) > 1.0$$

It is here favorable if the further upstream member blade row M(i) has a constriction larger by at most 25% than the further downstream member blade row M(i+1), according to the following provision:

$$KM(i)/KM(i+1) < 1.25$$

Here it is particularly advantageous if the further upstream member blade row M(i) has a constriction larger by at least 2% and by at most 12% than the further downstream member blade row M(i+1), according to the following provision:

$$1.02 < KM(i)/KM(i+1) < 1.12$$

If N>2, the position of the two respective adjacent member blade rows M(i) and M(i+1) within the blade row group is free according to the present invention.

In an advantageous form of the blade row group, it is provided according to the present invention that each member blade row participates in flow deflection and, correspondingly, has a profile camber in at least part of the main flow path width and, accordingly, none of the member blade rows has the character of a strut provided for merely structural reasons.

According to the present invention, the use of an increased constriction ratio of the stage and an optimized division of the constriction within blade row groups of the stage creates the prerequisite for the design of a fluid flow machine which includes the hybrid application of a conventionally developing blade technology, especially with rotors, and a design with blade row group, especially with stators. The inventive concept therefore provides completely novel solutions differing from the state of the art and creates a distinguished category of new fluid flow machines.

For a given pressure ratio of a fluid flow machine, weight and costs can be reduced by approx. 15 percent, with efficiency being maintained or improved.

If this concept is used in the compressor of an aircraft engine with approx. 25,000 lbs thrust, specific fuel consumption will be reduced by up to 1 percent.

LIST OF REFERENCE NUMERALS

1 Casing
2 Rotor shaft/hub
3 Machine axis

What is claimed is:

1. A fluid flow machine comprising:
a main flow path formed by a rotating shaft and a casing;
at least one arrangement of rotating blades, forming a rotor, positioned in the main flow path which transfers energy to the fluid;
at least one arrangement of stationary vanes, forming a stator, positioned in the main flow path adjacent to the rotor, with the rotor blades being attached to a rotating shaft and at least one of the arrangements of the rotor and the stator being formed by a blade/vane row group, with the at least one blade/vane row group having several adjacent rotor blade rows or stator vane rows of the same type as member blade/vane rows arranged in the main flow direction, with a contour of a cross-sectional area of the main flow path in at least one stage, having a rotor arrangement and a stator arrangement, resulting in an increased rotor-stator constriction ratio QRS, which satisfies the following equation:

$$[0.2 + (KT - 0.45)^{0.1}] < QRS$$

with QRS being defined to the following formula:

$$QRS = KR/KS$$

with KT being the total stage constriction, and QRS and KT being determined as follows:

$$QRS = KR/KS \text{ with } KR = ARI/ARA$$

$$\text{and } KS = ASI/ASA$$

$$KT = ARI/ASA$$

with ARI, ARA, AHU and ASA being calculated as follows:

$$ARI = \pi(R_2^2 - R_1^2)$$

$$ARA = \pi(R_4^2 - R_3^2)$$

$$ASI = \pi(R_6^2 - R_5^2)$$

$$ASA = \pi(R_8^2 - R_7^2)$$

where, in the direction of flow of the fluid flow machine:
$R_1$ is a radius on a radially innermost point (P1) of a leading edge of a most upstream blade row of the rotor,
$R_2$ is a radius on a radially outermost point (P2) of the leading edge of the most upstream blade row of the rotor,
$R_3$ is a radius on a radially innermost point (P3) of a trailing edge of a most downstream blade row of the rotor,
$R_4$ is a radius on a radially outermost point (P4) of the trailing edge of the most downstream blade row of the rotor,
$R_5$ is a radius on a radially innermost point (P5) of a leading edge of a most upstream vane row of the stator, $R_6$ is a radius on a radially outermost point (P6) of the leading edge of the most upstream vane row of the stator,
$R_7$ is a radius on a radially innermost point (P7) of a trailing edge of a most downstream vane row of the stator, and
$R_8$ is a radius on a radially outermost point (P8) of the trailing edge of the most downstream vane row of the stator;
wherein the blade row group of at least one of the arrangements of the rotor and the stator has an aereal contour of the main flow path, with areas being defined by a corner point radii of an i =1 to N member blade rows of the blade row group, with:
$R_{M(i)EI}$ being a radius of a radially innermost point of a leading edge of the $i^{th}$ member blade row,
$R_{M(i)EO}$ being a radius of a radially outermost point of the leading edge of the $i^{th}$ member blade row,
$R_{M(i)AI}$ being a radius of a radially innermost point of a trailing edge of the $i^{th}$ member blade row,
$R_{M(i)AO}$ being a radius of a radially outermost point of the trailing edge of the $i^{th}$ member blade row,
with a constriction KM(i) of a member blade row i being calculated from its entry surface AM(i)E and its exit surface AM(i)A according to:

$$KM(i) = AM(i)E/AM(i)A$$

with:

$$AM(i)E = \pi(R_{M(i)EO}^2 - R_{M(i)EI}^2)$$

$$AM(i)A = \pi(R_{M(i)AO}^2 - R_{M(i)AI}^2)$$

and with a constriction KM(i+1) of a member blade row i+1 being consequently calculated from its entry surface AM(i+1)E and its exit surface AM(i+1)A according to:

$$KM(i+1) = AM(i+1)E/AM(i+1)A$$

with:

$$AM(i+1)E = \pi(R_{M(i+1)EO}^2 - R_{M(1)EI}^2)$$

$$AM(i+1)A = \pi(R_{M(i+1)AO}^2 - R_{M(i+1)AI}^2)$$

with for at least one pair of blade rows, formed by two directly adjacent blade rows M(i) and M(i+1) of the blade row group, a constriction of the upstream member blade row M(i) and a constriction of the downstream member blade row M(i+1) satisfies an equation: KM(i)/KM(i+1) >0.85.

2. The fluid flow machine of claim 1, wherein the increased rotor-stator constriction ratio QRS is obtained by a shaping of a contour of the rotor shaft to depart from a smooth design.

3. The fluid flow machine of claim 1, wherein the increased rotor-stator constriction ratio QRS is obtained by a shaping of a contour of the casing to depart from a smooth design.

4. The fluid flow machine of claim 3, wherein the increased rotor-stator constriction ratio QRS is obtained by a combination of shaping of a contour of the rotor shaft and the contour of the casing to depart from the smooth design.

5. The fluid flow machine of claim 4, wherein the stator is formed by a vane row group having at least two directly adjacent member vane rows, with each member vane row having at least one of stationary vanes and vanes with an adjustable angle of attack.

6. The fluid flow machine of claim 5, wherein the rotor includes a hungle blade row of rotating blades.

7. The fluid flow machine of claim 1, and further comprising a further directly adjacent stage downstream of a stage formed by a rotor and a stator and having an increased rotor-stator constriction ratio QRS.

8. The fluid flow machine of claim 7, and further comprising at least two stages, each formed by a rotor and a stator, which have an increased rotor-stator constriction ratio QRS.

9. The fluid flow machine of claim 1, and further comprising at least two adjacent stages, each formed by a rotor and a stator, and having an increased rotor-stator constriction ratio QRS.

10. The fluid flow machine of claim 1, wherein for at least one pair of blade rows, formed by two directly adjacent blade rows M(i) and M(i+1) of the blade row group, the constriction of the upstream member blade row M(i) and the constriction of the downstream member blade row M(i+1) satisfies an equation: KM(i) / KM(i+1) >1.0.

11. The fluid flow machine of claim 10, wherein for at least one pair of blade rows, formed by the two directly adjacent blade rows M(i) and M(i+1) of the blade row group, the upstream member blade row M(i) has a constriction larger by at most 25% than the downstream member blade row M(i+1) according to KM(i)/KM(i+1) <1.25.

12. The fluid flow machine of claim 11, wherein for at least one pair of blade rows, formed by the two directly adjacent blade rows M(i) and M(i+1) of the blade row group, the upstream member blade row M(i) has a constriction larger by at least 2% and by at most 12% than the downstream member blade row M(i+1) according to 1.02<KM(i)/KM(i+1) <1.12.

13. The fluid flow machine of claim 1, wherein for at least one pair of blade rows, formed by the two directly adjacent blade rows M(i) and M(i+1) of the blade row group, the upstream member blade row M(i) has a constriction larger by at most 25% than the downstream member blade row M(i+1) according to KM(i)/KM(i+1) <1.25.

14. The fluid flow machine of claim 1, wherein for at least one pair of blade rows, formed by the two directly adjacent blade rows M(i) and M(i+1) of the blade row group, the upstream member blade row M(i) has a constriction larger by at least 2% and by at most 12% than the downstream member blade row M(i+1) according to 1.02<KM(i)/KM(i+1) <1.12.

15. The fluid flow machine of claim 1, wherein the increased rotor-stator constriction ratio QRS is obtained by a combination of shaping of a contour of the rotor shaft and the contour of the casing to depart from the smooth design.

16. The fluid flow machine of claim 1, wherein the stator is formed by a vane row group having at least two directly adjacent member vane rows, with each member vane row having at least one of stationary vanes and vanes with an adjustable angle of attack.

17. The fluid flow machine of claim 1, wherein the rotor includes a single blade row of rotating blades.

18. The fluid flow machine of claim 1, wherein the vane row group having at least two directly adjacent member vane rows is positioned upstream of at least one downstream compressor stage having a rotor and a stator.

* * * * *

UNITED STATES PATENT AND TRADEMARK OFFICE
CERTIFICATE OF CORRECTION

| | | |
|---|---|---|
| PATENT NO. | : 8,562,288 B2 | Page 1 of 1 |
| APPLICATION NO. | : 12/815805 | |
| DATED | : October 22, 2013 | |
| INVENTOR(S) | : Volker Guemmer | |

It is certified that error appears in the above-identified patent and that said Letters Patent is hereby corrected as shown below:

On the Title page, Item (73) should read, Assignee is Rolls-Royce Deutschland Ltd & Co KG Signed and Sealed this
Tenth Day of December, 2013

Margaret A. Focarino
*Commissioner for Patents of the United States Patent and Trademark Office*